(12) United States Patent
Pawlik

(10) Patent No.: US 6,325,575 B1
(45) Date of Patent: Dec. 4, 2001

(54) TOOL FOR MACHINING MULTIPLE SURFACES ON A STATIONARY WORKPIECE

(75) Inventor: James A Pawlik, Sterling Heights, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/566,894

(22) Filed: May 8, 2000

(51) Int. Cl.[7] .................................................. B23B 41/00
(52) U.S. Cl. ...................... 408/83.5; 408/224; 408/713; 408/189; 451/540; 451/430; 451/178
(58) Field of Search ................................ 451/540, 430, 451/177, 178, 179, 541, 548; 408/83.5, 189, 190, 191, 223, 224, 227, 713

(56) References Cited

U.S. PATENT DOCUMENTS

| | | |
|---|---|---|
| 1,999,599 | 4/1935 | Smith, Jr. . |
| 2,168,753 * | 8/1939 | Smith .................................. 451/540 |
| 2,204,855 * | 6/1940 | Healy .................................. 408/227 |
| 3,759,625 * | 9/1973 | Iversen .................................. 408/227 |
| 3,966,349 * | 6/1976 | Osman et al. ........................ 408/227 |
| 4,412,873 | 11/1983 | Hone et al. . |
| 4,512,689 * | 4/1985 | Bylund .................................. 408/713 |
| 4,651,475 * | 3/1987 | Appleby et al. ...................... 451/540 |
| 5,188,659 | 2/1993 | Purnell . |
| 5,197,231 * | 3/1993 | Pedersen et al. .................... 451/540 |
| 5,256,184 | 10/1993 | Kosco et al. . |
| 5,745,993 | 5/1998 | Adachi et al. . |
| 5,860,774 * | 1/1999 | Teper .................................. 408/227 |
| 5,882,250 * | 3/1999 | Foster .................................. 451/540 |

FOREIGN PATENT DOCUMENTS

| | | | |
|---|---|---|---|
| 001098332-A * | 1/1961 | (DE) .................................. 451/540 |
| 001214111-A * | 4/1966 | (DE) .................................. 451/540 |

* cited by examiner

Primary Examiner—Derris H. Banks
Assistant Examiner—Hadi Shakeri
(74) Attorney, Agent, or Firm—Mark P. Calcaterra

(57) ABSTRACT

A tool for simultaneously machining multiple surfaces on a stationary workpiece can include a rotary tool body having multiple cutter assemblies spaced circumferentially around the tool body. Different ones of the cutter assemblies can include differently angled cutting elements for machining different frusto-conical surfaces in the workpiece. At least some of the cutting elements can have two separate cutting edges.

16 Claims, 6 Drawing Sheets

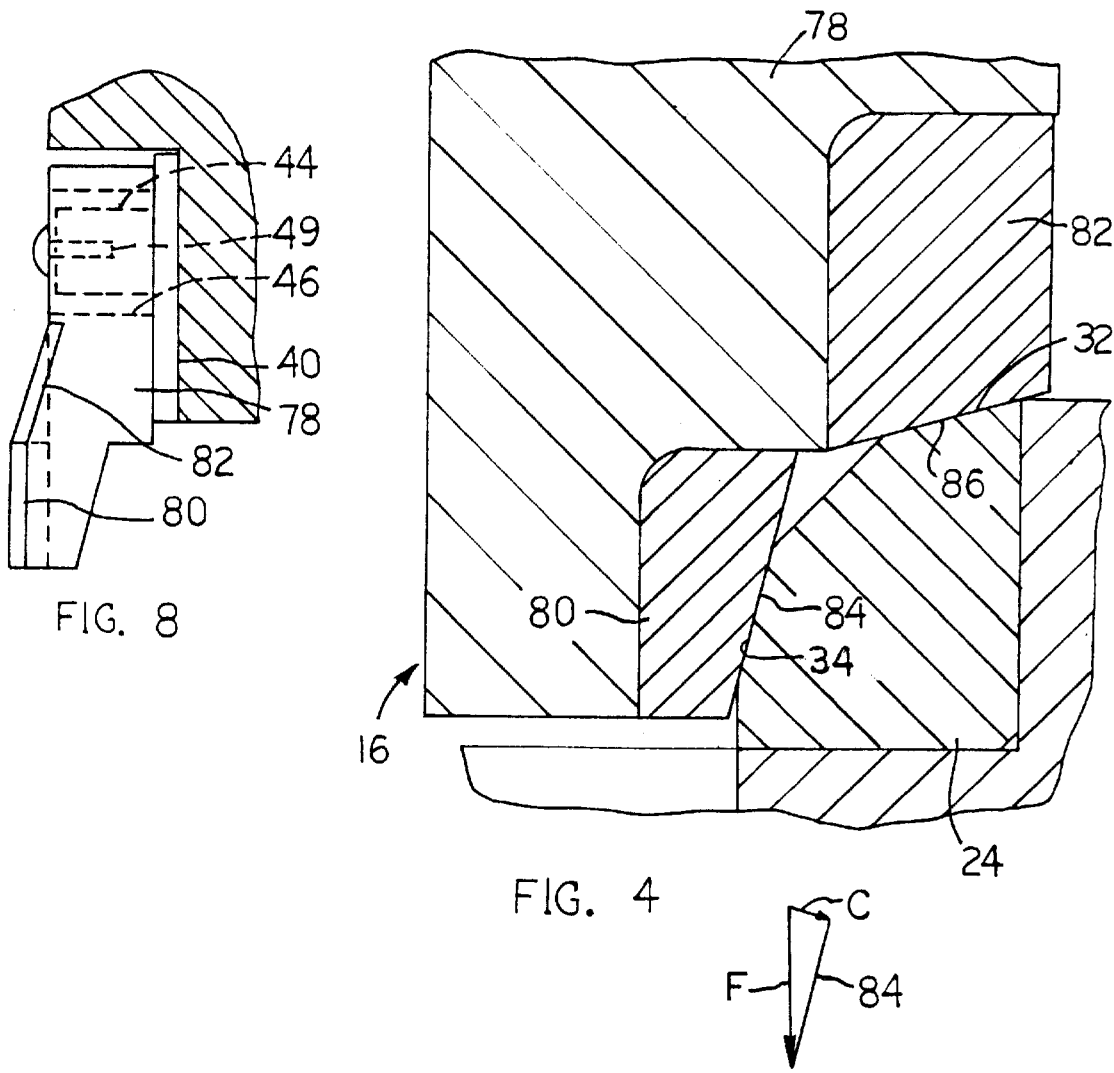

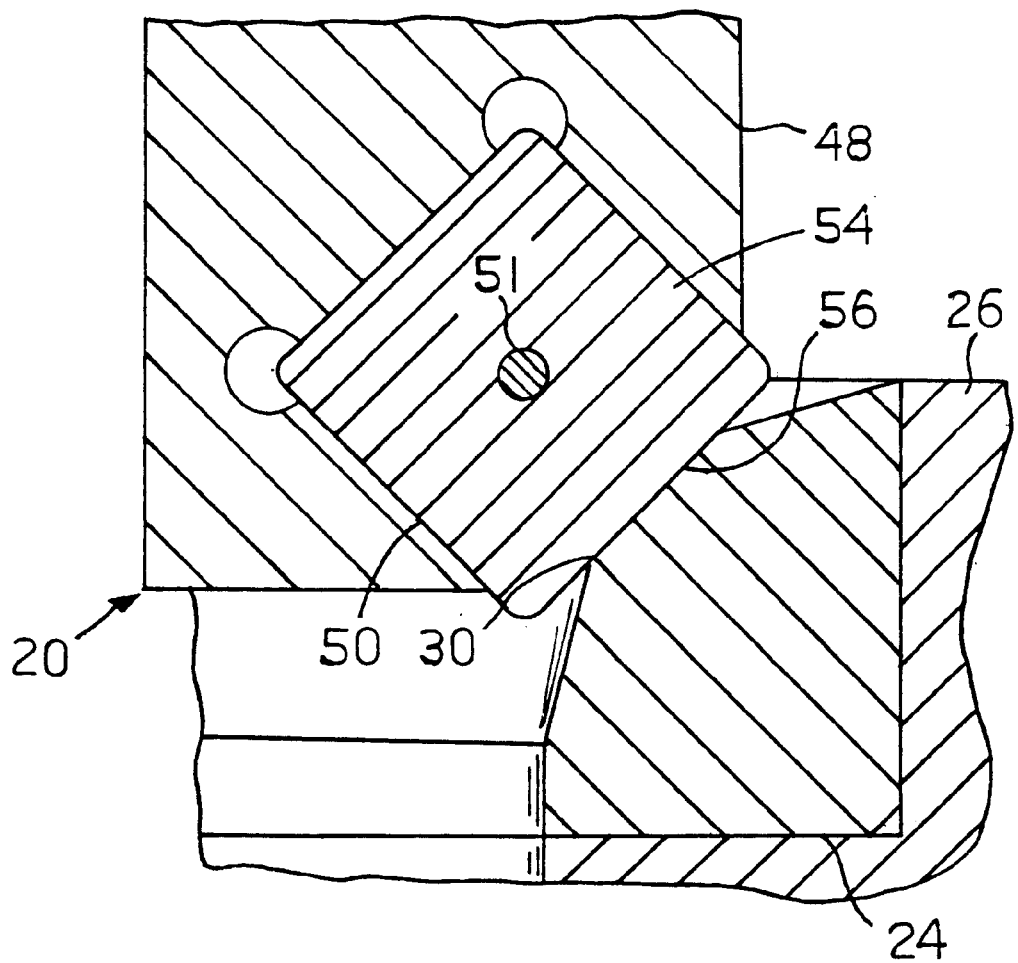
FIG. 6
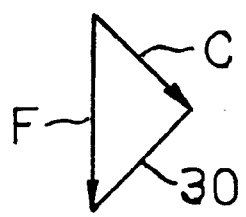

ND SUMMARY OF THE INVENTION

TOOL FOR MACHINING MULTIPLE SURFACES ON A STATIONARY WORKPIECE

BACKGROUND AND SUMMARY OF THE INVENTION

This invention relates to a rotary tool for machining multiple surfaces in a stationary workpiece. The invention is especially suited to the machining of multiple surfaces in an intake or exhaust passage in an engine cylinder head. A principal aim of the invention is to achieve multiple machining operations on a valve passage in a single pass of the machine tool.

In one conventional engine the cylinder head has multiple passages for delivering air to the combustion chambers, or for exhausting combustion products out of the combustion chambers. Each passage has a poppet valve therein for controlling gaseous flow. Each poppet valve has a peripheral edge surface seatable against an annular valve seat formed near the mouths of the passage.

Typically each valve seat is angled to the passage axis at forty five degrees. The mouth of the passage in direct connection with the valve seat is angled to the passage axis at sixty degrees. The face of the cylinder head bordering the mouth surface has a relatively slight angulation to the cylinder head surface. The annular throat surface leading to, or from, the valve seat is angled to the passage axis at fifteen degrees.

The angulation on the various passage surfaces facilitates a relatively smooth gaseous flow between the combustion chamber and the associated intake or exhaust passage. To achieve a relatively smooth surface finish, each of the described passage surfaces is machined to the desired angulation. The machining operations on the four described surfaces can be time-consuming when performed separately by separate machine tools.

The present invention relates to a machine tool for simultaneously machining multiple surfaces on a stationary workpiece during a single pass of the tool, thereby reducing the total time required to machine the various surfaces. The invention is particularly suited to the machining of multiple surfaces on the passages of an engine cylinder head.

A machine tool embodying the invention will typically be a vertical end milling machine that includes a rotary tool body mounted for simultaneous rotation and axial motion downward toward the mouth of a passage formed in a stationary cylinder head. The tool body has four cutter assemblies equidistantly spaced around the tool body circumference. Each cutter assembly includes a mounting mechanism and a cutting element adjustably positioned on the mounting mechanism, so that the cutting edges on the cutting elements can have precise positionment relative to passage surfaces on the workpiece (cylinder head). At least some of the cutting elements have two cutting edges angled at different angles to the tool body rotational axis.

The cutting elements are oriented so that during each revolution of the tool body each cutting edge on each cutting element exerts a predetermined cutting action on an aligned workpiece surface. A complete machining operation on multiple workpiece surfaces is achieved in a single downward plunge of the tool body. The total body stroke can be controlled as a function of time.

Specific features of the invention will be apparent from the attached drawings and description of a particular structural arrangement embodying the invention.

BRIEF DESCRIPTION OF THE DRAWINGS

FIG. 4 is an enlarged section view taken on line 4—4 in FIG. 2.

FIG. 6 is an enlarged sectional view taken on line 6—6 in FIG. 2.

FIG. 8 is a fragmentary elevational view of a cutter assembly used on the FIG. 1 machine tool. FIG. 8 is taken in the direction of arrow 8 in FIG. 2.

DESCRIPTION OF A PREFERRED EMBODIMENT OF THE INVENTION

Figures 1, 3:
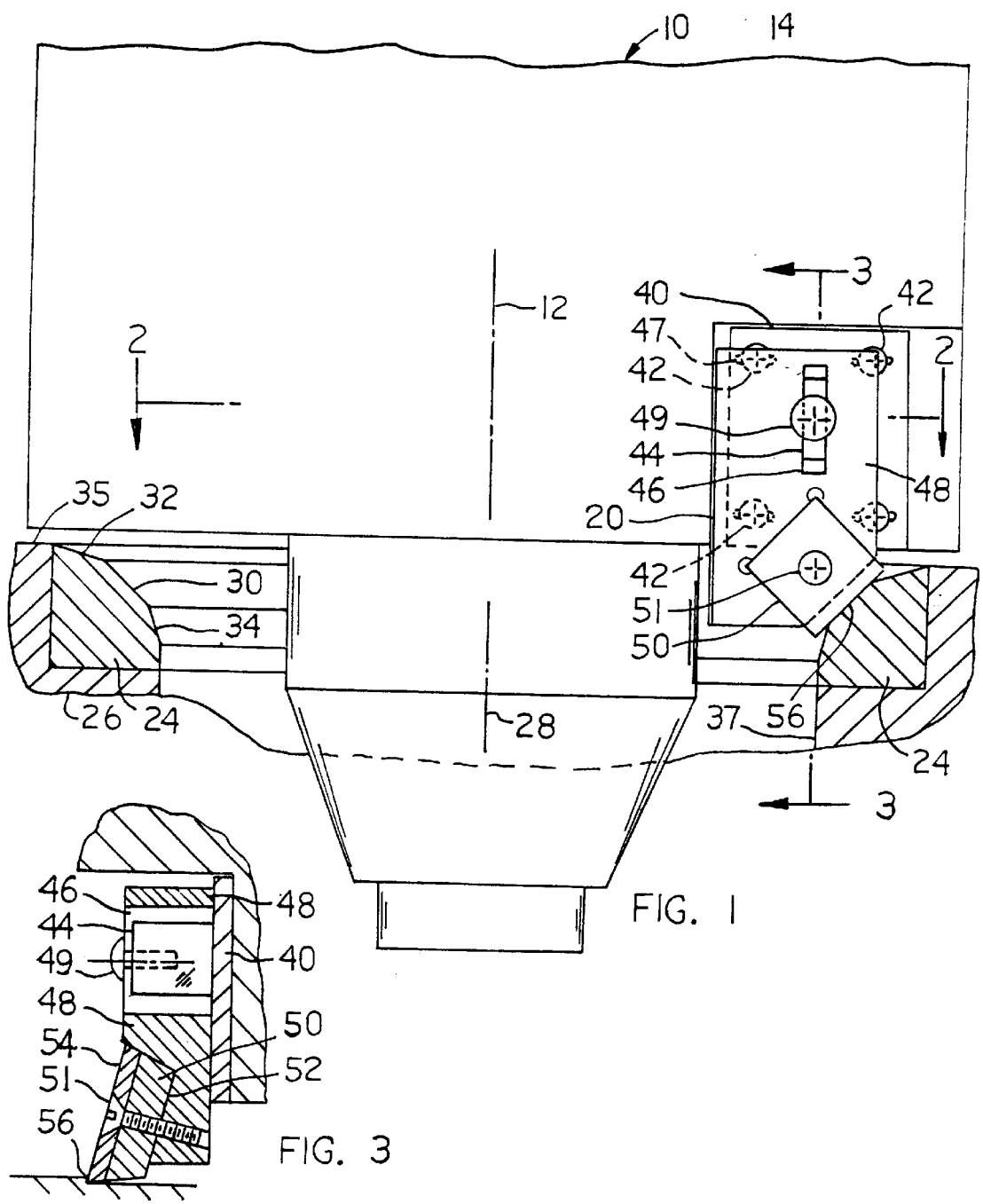
FIG. 1 is an elevational view of a machine tool embodying the present invention.
FIG. 3 is a fragmentary sectional view taken on line 3—3 in FIG. 3
Figure 2:
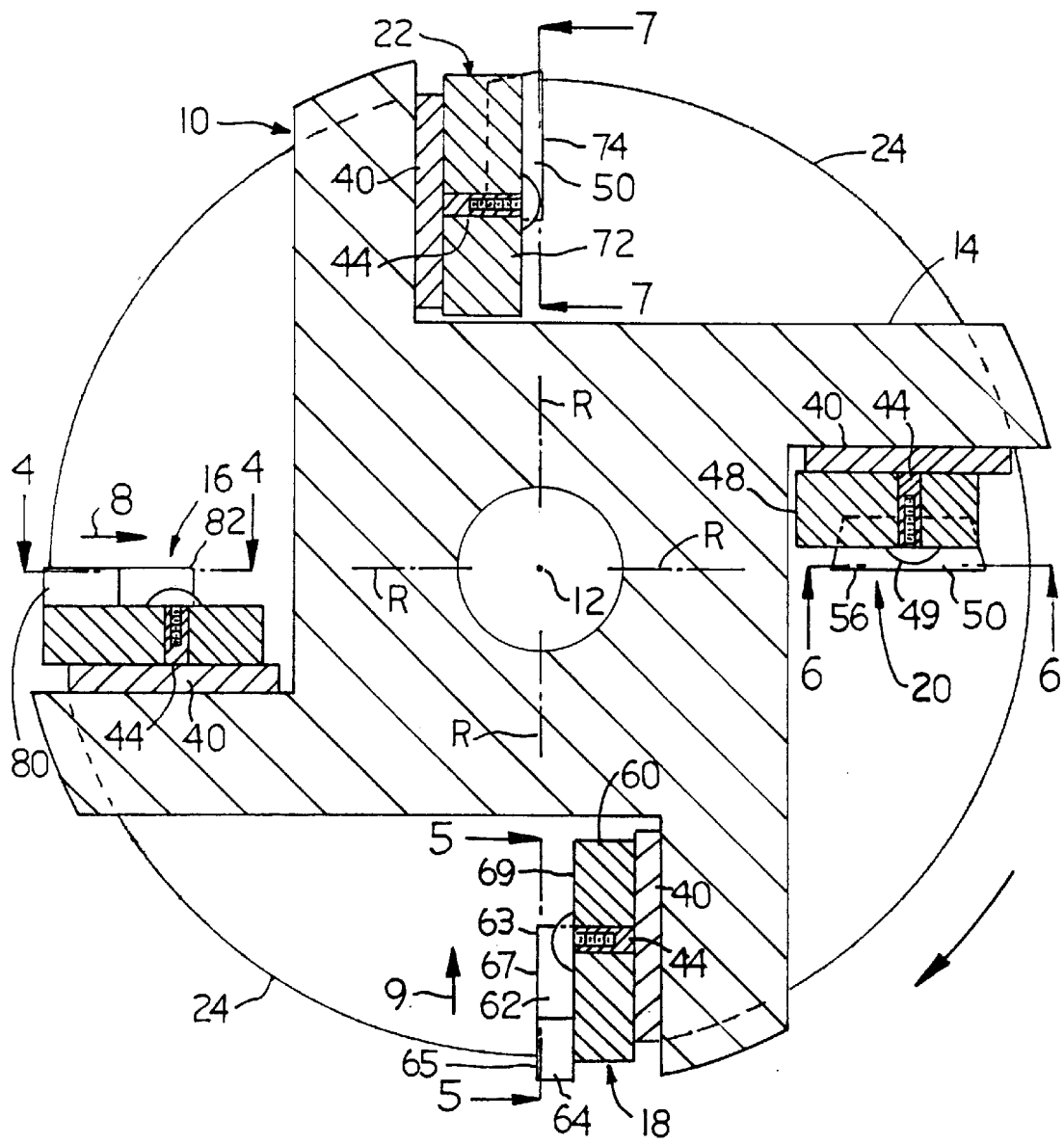
FIG. 2 is a transverse sectional view taken on line 2—2 in FIG. 1.

Referring to FIGS. 1 and 2, there is shown a machine tool 10 embodying the invention. The tool includes a rotary tool body 14 having a rotational axis 12, whereby the tool body is powered for rotary motion in a clockwise direction, as viewed in FIG. 2. Tool body 14 can be a driven component in a vertical end milling machine having a power feed for moving the tool body at a controlled rate along the tool axis 12.

As shown in FIG. 2, the tool body supports four circumferentially spaced cutter assemblies, designated by numerals 16, 18, 20 and 22. Each cutter assembly includes a cutting element that has at least one sharpened cutting edge oriented to exert a cutting action on a stationary workpiece 24. In preferred practice of the invention, the workpiece is a hardened annular insert press fit into an engine cylinder head 26. The annular insert can be formed of the material described in U.S. Pat. No. 5,188,659 issued to C. Pumell.

Annular insert 24 has an axis 28 that is coincident with the rotational axis 12 of tool body 14, when the tool body is properly oriented to the workpiece (annular insert). The machined workpiece is contoured to have an annular valve seat surface 30 angled to central axis 28 at forty five degrees, an annular mouth surface 32 angled to central axis 28 at seventy five degrees, and an annular throat surface 34 angled to central axis 28 at fifteen degrees. The angulation of surfaces 30, 32 and 34 can vary for different engines, according to the design preference of the engine manufacturer.

Although not shown in FIG. 1, the annular surface 35 bordering mouth surface 32 is machined at a slight angulation (e.g. two degrees) to the upper surface of cylinder head 26. The machined surfaces 30, 32, 34 and 35 are designed to facilitate a smooth transitional gas flow between the combustion chamber and passage 37 that extends through the cylinder head. The invention can be employed for machining either an engine intake passage or exhaust passage.

The machine tool of the present invention is designed to produce machined surfaces 30, 32 and 34, to a particular design surface finish, angulation, and axial location. A single plunge motion of rotating tool body 14, at a controlled rotational speed and axial feed rate, produces the desired machining operations on annular surfaces 30, 32, 34, and 35. The total axial movement of the tool body, from initial cutting element contact to the end of the downward plunge may be about 0.06 inch, in a typical machining cycle. At the end of the downward plunge, tool body 14 dwells for a short time (e.g. about 0.2 second) to remove any waviness from the machined surfaces.

The surface of principal concern, as regards location and surface smoothness, is valve seat surface 30. That particular surface is subjected to two separate machining operations, first by cutter assembly 18 and subsequently by cutter assembly 20. During each revolution of tool body 14, the cutting element on cutter assembly 18 removes some of the workpiece 24 surface material; during the same revolution the cutting element on cutter assembly 20 removes additional material from surface 24. There is a two stage cutting action that tends to achieve a smooth surface finish, while using a relatively high axial feed rate.

FIGS. 1, 3 and 6 show some features of cutter assembly 20. As shown, the cutter assembly is positioned on a support plate 40 that is fastened to a flat surface of the tool body 14 by four screws 42. Plate 40 carries a linear guide 44 that cooperates with a linear guide slot 46 in a mounting block 48, whereby the mounting block can be adjusted in a direction parallel to rotational axis 12 of tool body 14. Transverse slots 47 in plate 40 enable the plate to be adjusted transversely, so that linear guide 44 can be located at a precise distance from rotational axis 12. A set screw 49 can be used to clamp mounting block 48 in various adjusted positions (along guide 44).

The adjustment structure depicted in FIGS. 1 and 3 is merely illustrative of various adjustment mechanisms that can be employed in practice of the invention. The essential requirement is that cutter assembly 20 (and the three other cutter assemblies) be capable of adjustment along a line parallel to the tool body rotational axis 12.

Cutter assembly 20 includes the mounting block 48 and a cutting element 50 clamped to the block by a screw 51. Cutting element 50 includes a blacking plate 52 and a disk 54 formed of a material suitable for exerting a cutting action on the workpiece material. The disk is permanently laminated to the backing plate, as by brazing. Disk 54 can be formed of various materials, e.g. tungsten carbide, or a material supplied by General Electric Co. under the designation "6000 CBN". The disk has four sharpened edges 56 that can be selectively presented to the work surface. The operative cutting edge 56 is located in a radial plane R generated from rotational axis 12.

As shown in FIG. 3, the cutting element 50 has a positive rake angle relative to the workpiece surface.

Figures 5, 9:
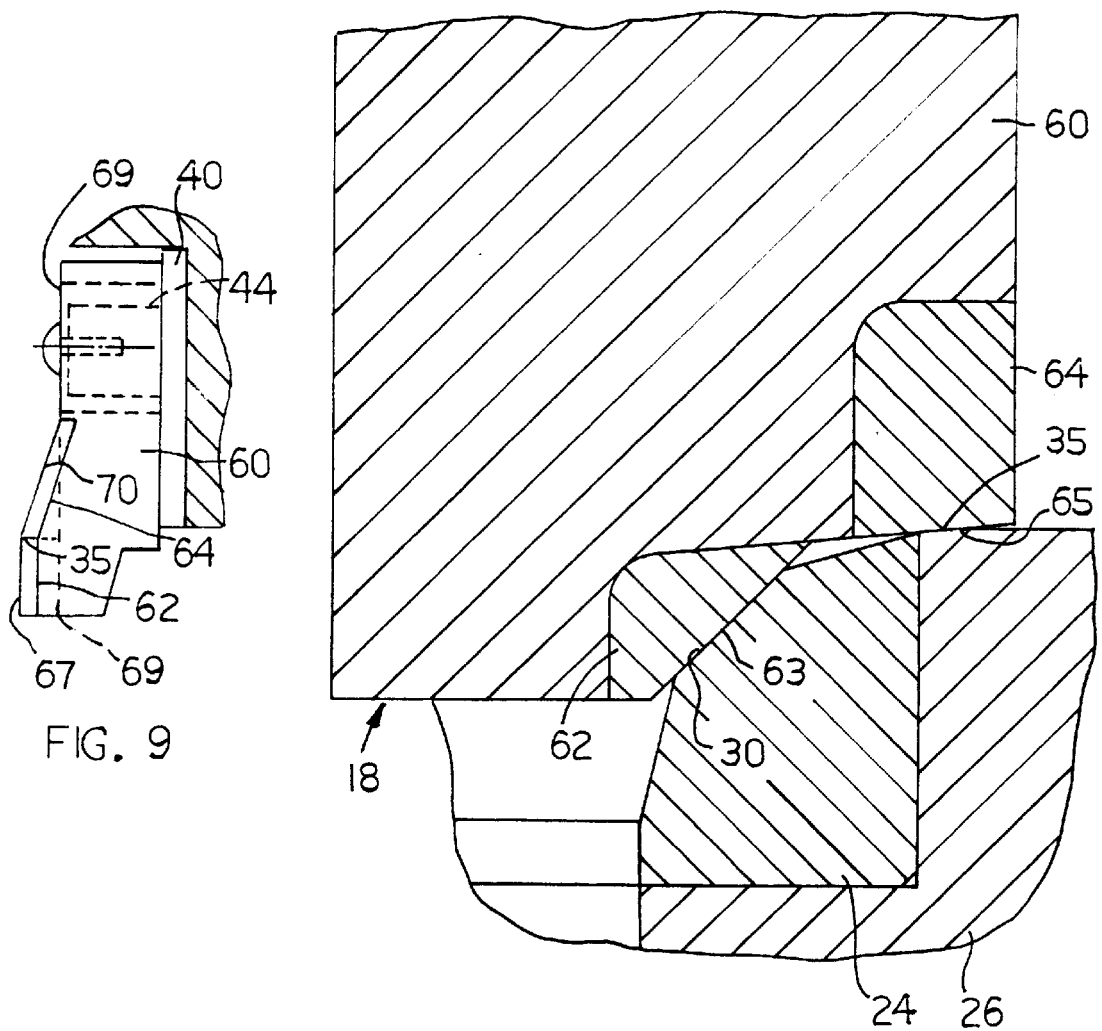
FIG. 5 is an enlarged sectional view taken on line 5—5 in FIG. 2.
FIG. 9 is a fragmentary view taken in the directions of arrow 9 in FIG. 2.

Cutter assembly 18 is best shown in FIGS. 2, 5 and 9. The cutter assembly includes a mounting block 60 adjustably positioned on a support plate 40 that has a linear guide 44 for enabling the cutter assembly to be adjusted along a line parallel to rotational axis 12. A first cutting element 62 is brazed to an obliquely angled surface on block 60, to form a cutting edge 63 suitably angled to machine surface 30 on annular insert 24. A second cutting element 64 is brazed to another angled surface on block 60, to form a cutting edge 65 that is suitably angled to machine surface 35 on the cylinder head 26.

Cutting element 62 has a frontal surface 67, that slopes toward a frontal surface 69 on block 60, to provide a positive rake angle for cutting edge 63. Cutting element 64 has a frontal surface 70 that slopes toward frontal surface 69 on block 60, to form a positive rake angle for cutting edge 65. In each case, the slope direction is normal to the respective cutting edge.

It will be seen that cutter assembly 18 provides two cutting edges 63 and 65 angled at different angles to tool body rotational axis 12 for machining different frusto-conical surfaces 30 and 35 on the stationary workpiece. As shown in FIG. 2, both cutting edges 63 and 65 are located in a radial plane R generated from rotational axis 12.

Figure 7:
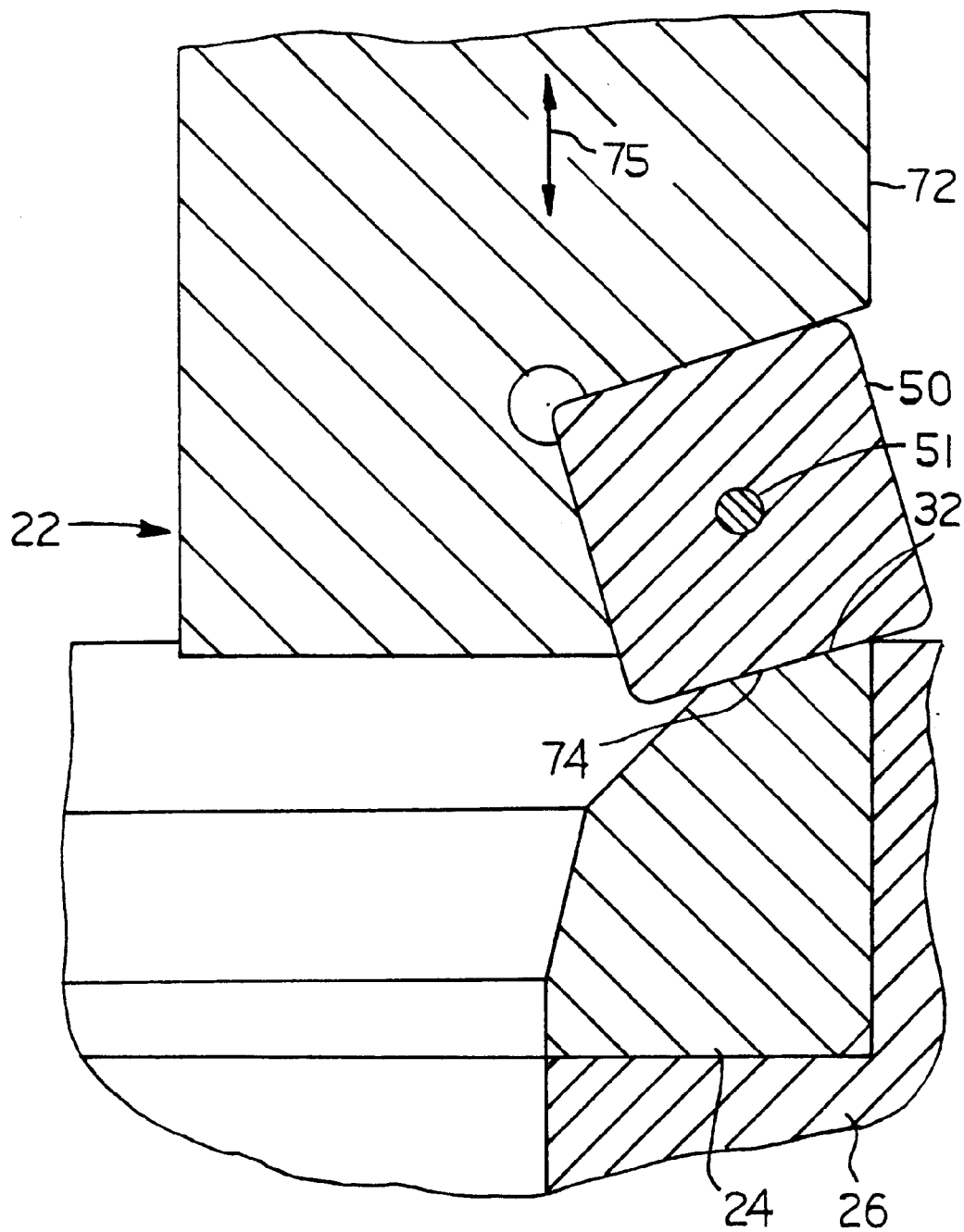
FIG. 7 is an enlarged sectional view taken on line 7—7 in FIG. 2.

Cutter assembly 22 is best shown in FIGS. 2 and 7. The cutter assembly includes a mounting block 72 constructed generally similarly to block 48 of cutter assembly 20. As shown in FIG. 7, block 72 is suitably recessed to support a cutting element 50 that is constructed similarly to the cutter element 50 shown in FIG. 3. The cutter element 50 depicted in FIG. 7 has a cutting edge 74 oriented to machine surface 32 on the annular insert 24. Cutting edge 74 is located on a radial plane R generated from rotational axis 12. Cutting assembly 22 can be adjusted along an imaginary line 75 by an adjustment structure similar to that used for cutter assembly 20.

Cutter assembly 16 is best shown in FIGS. 2 and 4. The FIG. 4 construction is generally similar to the FIG. 5 structure, except for the angulations of the cutting elements. The FIG. 4 cutter assembly includes a mounting block 78 that is machined to support two separate cutting elements 80 and 82. Cutting element 80 has a cutting edge 84 for exerting a cutting action on throat surface 34 of the annular insert 24. Cutting element 82 has a cutting edge 86 for exerting a cutting action on mouth surface 32 of annular insert 24.

The cutting element support surfaces on mounting block 78 are obliquely angled to the angularly orient cutting elements 80 and 82, to achieve positive rake angles for the respective cutting elements. Each cutting edge 84 or 86 is located in an imaginary plane R generated from rotational axis 12.

During each revolution of tool body 14 cutter assembly 16 exerts two separate cutting actions on surfaces 34 and 32 of the workpiece 24; cutter assembly 18 exerts two separate cutting actions on surfaces 30 and 35 of the workpiece; cutter assembly 20 exerts a single e cutting action on workpiece surface 30; and cutter assembly 22 exerts a single cutting action on workpiece surface 32. Valve seat surface 30 is subjected to two successive cutting actions by cutting edges 63 and 56. Mouth surface 32 is subjected to two successive cutting actions by cutting edges 86 and 74.

The angulations of the cutting edges in relation to the axial feed direction are such that the depth of cut for each cutting edge is somewhat less than the axial feed per revolution. For example, as viewed in FIG. 6, an axial feed distance F produces a cutting depth C on surface 30 that is only about seventy percent of feed distance F. Similarly, as viewed in FIG. 4, an axial feed distance F produces a cutting depth C on throat surface 84 that is only about twenty six percent of feed distance F.

If the cutting depth on any given workpiece surface is too small, in relation to the radius on the cutting edge of the cutting element, then the cutting element will tend to ride along the work surface, instead of cutting into the workpiece surface. The workpiece surface will be subjected to a burnishing action (instead of a cutting action), with a considerable generation of heat at the cutting edge. The service life of the cutting element may be considerably shortened.

The radius on the cutting edge of each cutting element is normally about 0.0006 inch. The depth of cut should be at least three times the radius on the cutting edge, to prevent the undesired burnishing action between the cutting edge and workpiece surface. If we assume a minimum depth of cut to be about 0.002 inch, then the minimum axial feed rate will be about four times 0.002 inch, or 0.008 inch per revolution. This feed rate is based on the fact that cutting depth C on throat surface 84 is only about one fourth the axial feed rate.

As indicated previously, the workpiece surface of major concern is valve seat 30. With an axial feed rate of 0.008 inch, the total depth of cut on surface 30 will be approximately 0.006 inch (i.e., about seventy percent of the axial feed distance). When surface 30 is subjected to two separate cutting actions (by cutter assemblies 18 and 20), the depth of cut can be apportioned between the two cutter assemblies to achieve a satisfactory final surface smoothness and dimensional precision. Preferably the cutting elements on cutter assemblies 18 and 20 are adjusted so that cutting element 62 has a greater cutting depth than cutting element 54, e.g., 0.004 inch for element 62 and 0.002 inch for element 54. The respective cutting elements are adjusted on support plates 40 to achieve the desired cutting depths.

The present invention is believed to provide an improved overall cutting action on multiple workpiece surfaces, in that a sufficient axial feed rate can be achieved to obtain a sufficient cutting depth on the less angled throat surface 34, without an excessive cutting depth on the greater angulated surfaces 30 and 32. The invention achieves a controlled cutting action on hardened workpieces surfaces, and a potentially longer cutting element service life. The cutting elements are designed to facilitate easy sharpening of the various cutting edges.

What is claimed:

1. A tool for simultaneously machining multiple surfaces on a stationary workpiece, said tool comprising:
   a tool body having a rotational axis, said tool body being supported for movement along said rotational axis to perform multiple machining operations; and
   multiple cutter assemblies supported on said tool body, said cutter assemblies being circumferentially spaced around said tool body rotational axis, said multiple cutter having four cutting edges, each of two of the four cutting edges having two cutting surfaces, each of the two cutting surfaces for machining two surfaces in a single pass, each cutter assembly comprising:
   a mounting mechanism and a cutting element secured to said mounting mechanism, each cutting element having at least one cutting edge, at least one of said cutting elements having two cutting edges angled at different angles to the tool body rotational axis for machining different frusto-conical surfaces in the stationary work piece.

2. The tool of claim 1, wherein there are four cutting elements equidistantly spaced around the tool body rotational axis.

3. The tool of claim 1, wherein one of said cutting elements has a first cutting edge angled at a predetermined angle to the tool body rotational axis, and another of said cutting elements has a second cutting edge angled at the same predetermined angle; said cutting elements being located on the tool body so that said second cutting edge is axially advanced relative to said first cutting edge, whereby said first and second cutting edges exert separate cutting actions on the same work piece surface during each revolution of the tool body.

4. The tool of claim 3, wherein said cutting elements are oriented so that said second cutting edge has a lesser cutting depth than said first cutting edge.

5. The tool of claim 1, wherein there are four cutter assemblies equidistantly spaced around the tool body rotational axis; the cutting elements in said cutter assemblies having cutting edges located in planes that radiate from the tool body rotational axis.

6. The tool of claim 1, and further comprising means for adjusting each cutter assembly on the tool body along an imaginary line parallel to the tool body rotational axis.

7. The tool of claim 5, wherein said cutter assemblies are located on said tool body so that each cutting edge exerts a separate cutting action on a work piece surface during each revolution of the tool body.

8. The tool of claim 1, wherein each cutting element has a positive rake angle measured from the respective cutting edge.

9. The tool of claim 1, wherein each cutting edge is sharpenable.

10. The tool of claim 1, wherein one of the cutting elements has a first cutting edge angled to the tool body rotational axis at forty five degrees and a second cutting edge angled to the tool body rotational axis at about ninety degrees.

11. The tool of claim 10, wherein said first and second cutting edge have positive rake angles.

12. The tool of claim 1, wherein one of the cutting elements has a first cutting edge angled to the tool body rotational axis at fifteen degrees and a second cutting edge angled to the tool body rotational axis at seventy five degrees.

13. The tool of claim 1, wherein each cutter assembly is removable from the tool body for renewing the cutting edges on said cutting elements.

14. The tool of claim 1 herein each of the other two of the four cutting edges having a single cutting surface for machining at least one surface in the single pass.

15. A tool for simultaneously machining multiple surfaces on a stationary workpiece; said tool comprising:
   a tool body having a rotational axis, said tool body being supported for movement along said rotational axis to perform multiple machining operations; and
   multiple cutter assemblies supported on said tool body, said cutter assemblies being circumferentially spaced around said tool body rotational axis, each cutter assembly comprising:
   a mounting mechanism and a cutting element secured to said mounting mechanism, each cutting element having at least one cutting edge, at least one of said cutting elements having two cutting edges angled at different angles to the tool body rotational axis for machining different frusto-conical surfaces in the stationary work piece, said multiple cutters are four cutting elements equidistantly spaced around the tool body, said four cutting elements comprising a first cutting element having two cutting edges for machining a valve passage mouth surface and valve passage throat surface a second cutting element having two cutting edges for machining a valve seat and combustion surface, a third cutting element having a single cutting edge for machining the valve seat, and a fourth cutting element having a single cutting edge for machining the valve passage mouth surface.

16. A tool for simultaneously machining multiple surfaces on a stationary workpiece; said tool comprising:
   a tool body having a rotational axis, said tool body being supported for movement along said rotational axis to perform multiple machining operations; and
   multiple cutter assemblies supported on said tool body, said cutter assemblies being circumferentially spaced around said tool body rotational axis, each cutter assembly comprising:
   a mounting mechanism and a cutting element secured to said mounting mechanism, each cutting element having at least one cutting edge, at least one of said cutting elements having two cutting edges angled at different angles to the tool body rotational axis for machining different frusto-conical surfaces in the stationary work piece; and means for adjusting each cutter assembly on the tool body in a direction parallel to the tool body rotational axis, said adjusting means comprising a linear guide on the tool body and a linear slot in said mounting mechanism slidable on said linear guide.

* * * * *